(12) United States Patent
Yeh

(10) Patent No.: US 6,585,135 B1
(45) Date of Patent: Jul. 1, 2003

(54) ANTI-REVERSE STRUCTURE OF A CONTINUOUS PNEUMATIC OIL FEEDING GUN

(76) Inventor: Kuo-Chung Yeh, 43-2, Wa Tsuo,Kuo Kou Li, Tai Bao City, Jia Yi Hsien (TW)

( * ) Notice: Subject to any disclaimer, the term of this patent is extended or adjusted under 35 U.S.C. 154(b) by 35 days.

(21) Appl. No.: 10/051,700

(22) Filed: Jan. 18, 2002

(51) Int. Cl.$^7$ ................................................ G01F 11/06
(52) U.S. Cl. ...................................... 222/256; 222/262
(58) Field of Search ................................ 222/256, 262

(56) References Cited

U.S. PATENT DOCUMENTS

| | | | | |
|---|---|---|---|---|
| 2,039,881 A | * | 5/1936 | Carter | 222/256 |
| 2,134,735 A | * | 11/1938 | Reinhold | 222/262 |
| 3,316,853 A | * | 5/1967 | Schneller | 222/256 |
| 4,168,787 A | * | 9/1979 | Stamper | 222/256 |
| 4,664,298 A | * | 5/1987 | Shew | 222/256 |
| 6,290,106 B1 | * | 9/2001 | Kuo | 222/256 |

* cited by examiner

Primary Examiner—Kenneth Bomberg
(74) Attorney, Agent, or Firm—Alan D. Kamrath; Rider Bennett, LLP

(57) ABSTRACT

The present invention relates to an anti-reverse structure of a continuous pneumatic oil feeding gun. An anti-reverse valve is mounted in the gun bore and includes a valve body formed with an annular groove communicated with the oil supply hole, an oil inlet hole connected between the annular groove and the bore of the bore body, and an oil outlet hole connected between the bore of the bore body and the oil supply hole. Each of the oil inlet and outlet holes is formed with an enlarged receiving space for receiving a ball. The enlarged receiving space is formed with a reduced catch portion to prevent from falling of the ball.

7 Claims, 6 Drawing Sheets

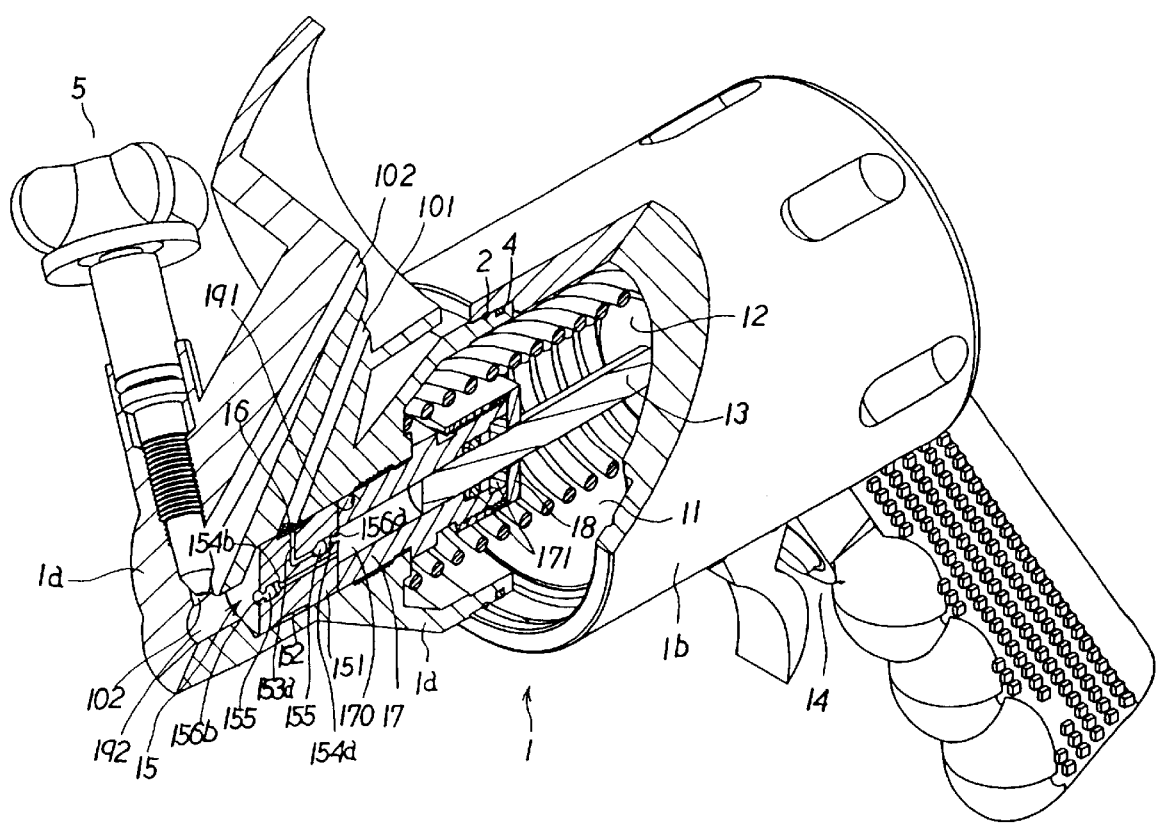
F I G. 3

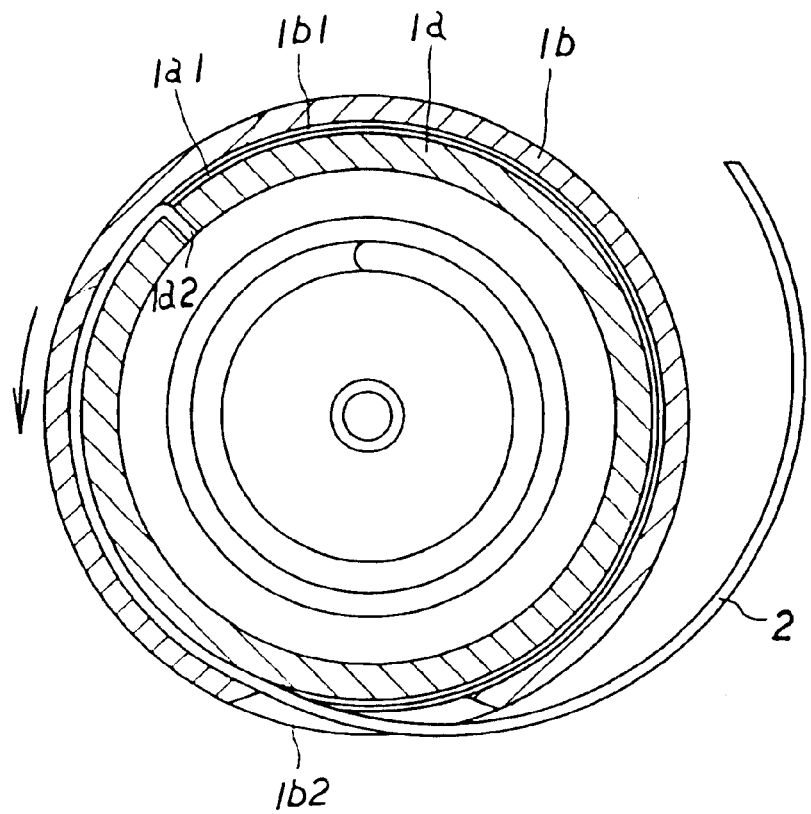
F I G. 6

ANTI-REVERSE STRUCTURE OF A CONTINUOUS PNEUMATIC OIL FEEDING GUN

BACKGROUND OF THE INVENTION

1. Field of the Invention

The present invention relates to an anti-reverse structure of a continuous pneumatic oil feeding gun, and more particularly to an anti-reverse structure of a continuous pneumatic oil feeding gun, wherein the anti-reverse valve that may prevent the oil from returning into the oil storage tank.

2. Description of the Related Art

A conventional pneumatic oil feeding gun in accordance with the prior art comprises a main body formed with a piston chamber for receiving a piston which has a front end provided with a plunger which may be moved in a bore of the main body. The main body is provided with an oil storage tank which has an oil feeding hole connected to the bore. Thus, when the trigger of the oil feeding pneumatic gun is pressed, the piston may be moved reciprocally, so that the plunger may also be moved reciprocally. Thus, when the plunger is moved backward, the oil contained in the oil storage tank may be pushed into the bore. Then, the plunger may be moved forward, so that the oil contained in the bore may be pushed outward, and the pneumatic oil feeding gun may supply the oil outward continuously.

However, the conventional pneumatic oil feeding gun in accordance with the prior art has the following disadvantages.

1. When the oil supplied by the pneumatic oil feeding gun is excessive, the oil easily returns into the main body of the pneumatic oil feeding gun, thereby affecting operation of the pneumatic oil feeding gun.

2. The main body of the pneumatic oil feeding gun includes a gun head and a gun body. The gun head is provided with a groove for receiving a seal ring, and is provided with an annular positioning groove. The gun body has an outer wall provided with a thread that may be extended into the positioning groove, so that the gun body may be rotated relative to the gun head and will not detach from the gun head. However, the thread easily rubs the positioning groove, thereby causing wear.

SUMMARY OF THE INVENTION

The present invention has arisen to mitigate and/or obviate the disadvantage of the conventional pneumatic oil feeding gun.

The primary objective of the present invention is to provide an anti-reverse structure of a continuous pneumatic oil feeding gun.

Another objective of the present invention is to provide an anti-reverse structure that may provide highly pressurized oil, may regulate the oil pressure, and may release the oil pressure entirely.

In accordance with the present invention, there is provided an anti-reverse structure of a continuous pneumatic oil feeding gun, comprising a main body provided with an oil storage tank, the main body provided with a gun bore which has a front end formed with an oil supply hole, an oil feeding hole connected between the gun bore and the oil storage tank, a plunger mounted in a bore of the bore body to move in the bore of the bore body reciprocally, wherein:

an anti-reverse valve is mounted in the gun bore, the anti-reverse valve includes a valve body having an outer wall formed with an annular groove communicated with the oil supply hole, the valve body is formed with an oil inlet hole connected between the annular groove and the bore of the bore body, the valve body is formed with an oil outlet hole connected between the bore of the bore body and the oil supply hole, the oil inlet hole of the valve body is formed with an enlarged receiving space located adjacent to the bore of the bore body for receiving a ball, the oil outlet hole of the valve body is formed with an enlarged receiving space located adjacent to the bore of the bore body for receiving a ball, the enlarged receiving space of the oil inlet hole of the valve body is formed with a reduced catch portion to prevent from falling of the ball, and the enlarged receiving space of the oil outlet hole of the valve body is formed with a reduced catch portion to prevent from falling of the ball.

Thus, when the plunger is moved backward, the oil contained in the oil storage tank may be sucked into the oil feeding hole, then flows through the annular groove and the oil inlet hole of the valve body of the anti-reverse valve, then pushes away the ball in the enlarged receiving space, and is then sucked into the bore of the bore body. At the same time, the ball in the enlarged receiving space will block the oil outlet hole due to the sucking action of the plunger, thereby preventing the oil contained in the oil supply hole from being sucked into the bore of the bore body. Alternatively, when the plunger is moved forward, the oil contained in the bore of the bore body may be pushed into the oil outlet hole, then pushes away the ball in the enlarged receiving space, thereby opening the oil outlet hole, so that the oil may be pushed into the oil supply hole. At the same time, the ball in the enlarged receiving space will block the oil inlet hole due to the pushing action of the plunger, thereby preventing the oil contained in the bore of the bore body from being returned into the oil storage tank. Thus, by provision of the anti-reverse valve, the oil feeding pneumatic gun may supply the oil outward continuously, and may provide highly pressurized oil, thereby satisfying the requirement of the user.

Preferably, the gun body is provided with an oil return hole connected between the oil storage tank and the oil supply hole of the oil feeding pneumatic gun, and a needle valve is screwed on the gun body, and has a distal end that may close or open the oil return hole.

Preferably, the gun body is provided with an oil pressure release hole connected between the oil storage tank and the oil supply hole of the oil feeding pneumatic gun, and a pressure valve is screwed on the gun body to close or open the oil pressure release hole. Preferably, the pressure valve includes a ball that may close or open the oil pressure release hole, a spring pressing the ball, and a screw rested on the spring.

Preferably, the bore body has a center formed with a bore, and has an outer wall provided with a leakproof member, a cap is screwed on the outer wall of the bore body to press the leakproof member, so that the plunger in turn passes through the cap, the leakproof member and extends into the bore.

Preferably, the main body includes a gun head and a gun body, the gun head and the gun body are formed with mating semi-circular cross-sectional shaped annular positioning grooves, the annular positioning groove of the gun head is formed with a positioning hole, the gun body is formed with an elongated slit mating with the annular positioning groove, a bushing line has one end extended through the elongated slit into the positioning hole of the gun head, and the gun head or the gun body may then be rotated, so that the bushing line may be inserted into the two annular positioning grooves.

BRIEF DESCRIPTION OF THE DRAWINGS

FIG. 3 is a partially cut-away cross-sectional view of the anti-reverse structure of a continuous pneumatic oil feeding gun as shown in FIG. 1;

FIG. 6 is a front plan cross-sectional view of anti-reverse structure of a continuous pneumatic oil feeding gun as shown in FIG. 1.

DETAILED DESCRIPTION OF THE INVENTION

Figure 1:
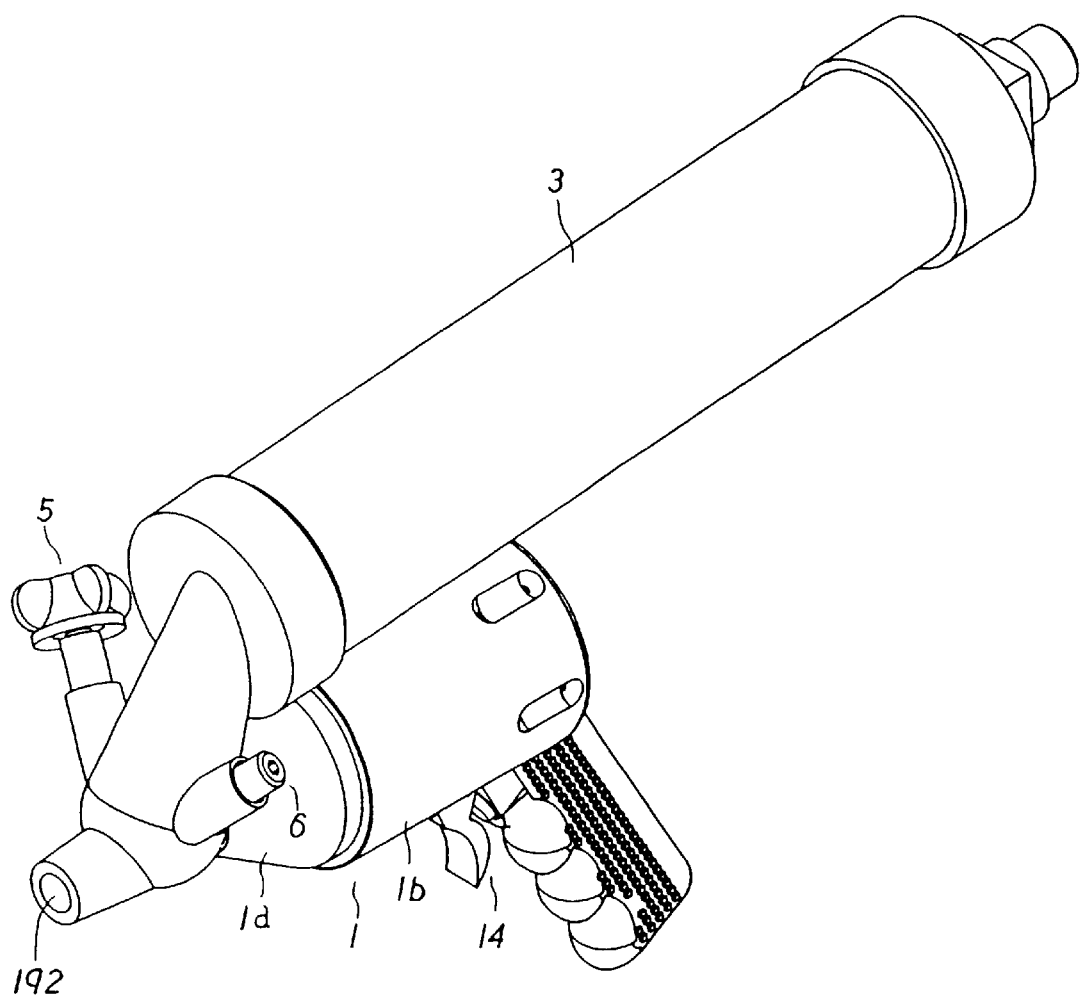
FIG. 1 is a perspective view of an anti-reverse structure of a continuous pneumatic oil feeding gun in accordance with a preferred embodiment of the present invention.
Figure 2:
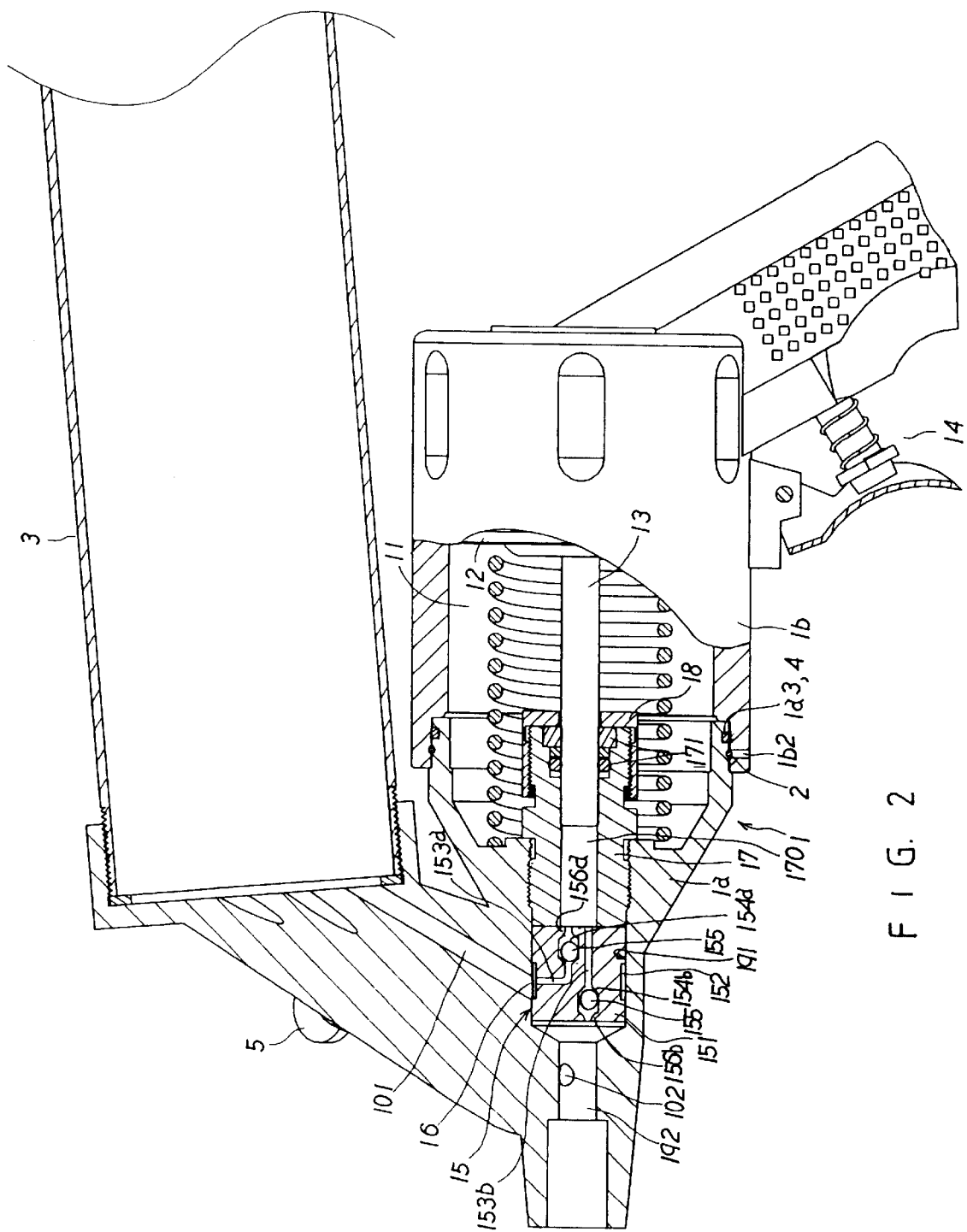
FIG. 2 is a side plan cross-sectional view of the anti-reverse structure of a continuous pneumatic oil feeding gun as shown in FIG. 1.

Referring to the drawings and initially to FIGS. 1 and 2, an anti-reverse structure of a continuous pneumatic oil feeding gun in accordance with a preferred embodiment of the present invention comprises a gun head 1a, and a gun body 1b.

Figure 5:
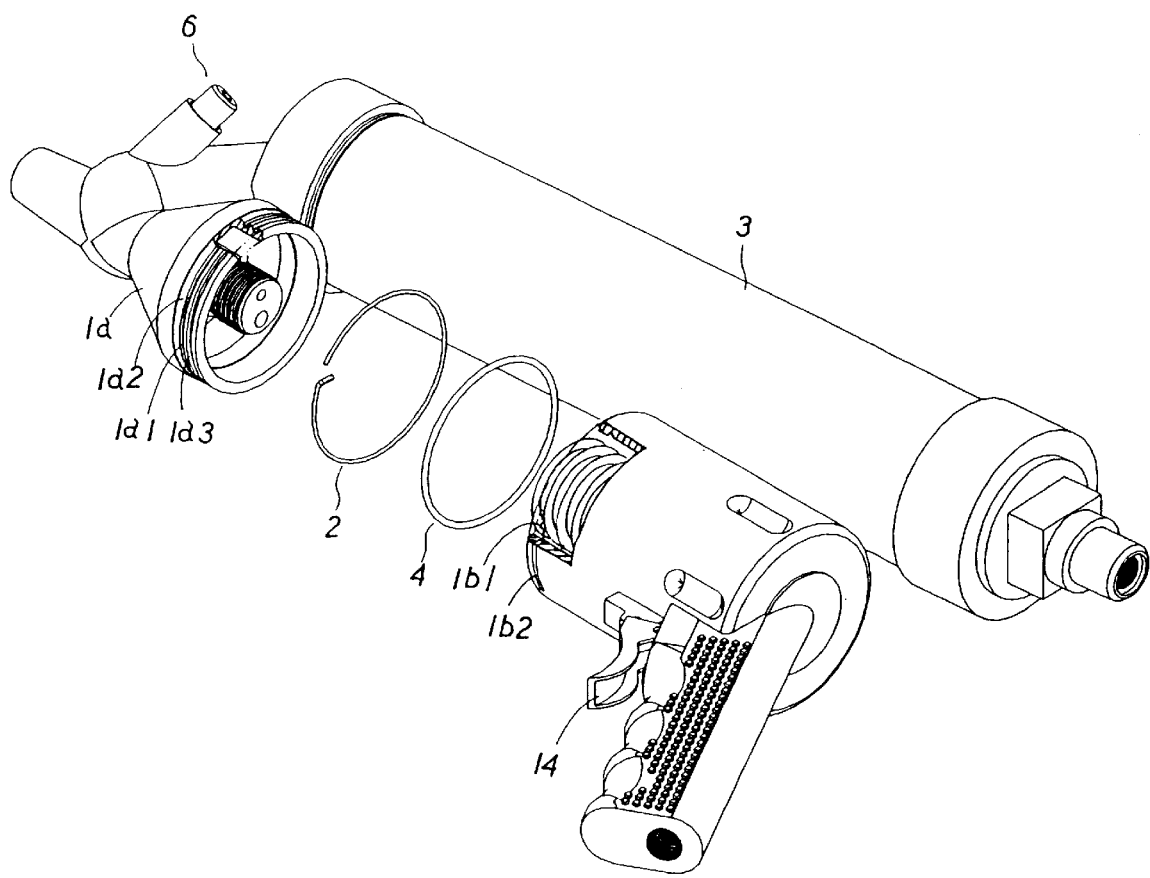
FIG. 5 is a partially exploded perspective view of the anti-reverse structure of a continuous pneumatic oil feeding gun as shown in FIG. 1.

The combination situation of the gun head 1a and the gun body 1b is shown in FIGS. 5 and 6. As shown in FIGS. 5 and 6, the gun head 1a and the gun body 1b are formed with mating semi-circular cross-sectional shaped annular positioning grooves 1a1 and 1b1. The gun head 1a has a distal end formed with a groove 1a3 in which a seal ring 4 is mounted. The annular positioning groove 1a1 of the gun head 1a is formed with a positioning hole 1a2, and the gun body 1b is formed with an elongated slit 1b2 mating with the annular positioning groove 1b1. A bushing line 2 has one end extended through the elongated slit 1b2 into the positioning hole 1a2 of the gun head 1a, and the gun head 1a or the gun body 1b may then be rotated, so that the bushing line 2 may be inserted into the annular positioning grooves 1a1 and 1b1, the gun head 1a and the gun body 1b may be combined axially, the bushing line 2 is in facial contact with the gun head 1a and the gun body 1b, and the bushing line 2 may have the effect of a bearing. Thus, the gun head 1a and the gun body 1b may be combined easily, rigidly and stably.

In addition, the gun body 1b is formed with a piston chamber 11 for receiving a piston 12 which has a front end provided with a plunger 13. The gun body 1b is provided with an oil storage tank 3. Thus, when the trigger 14 of the oil feeding pneumatic gun is pressed, the piston 12 may be moved reciprocally, so that the plunger 13 may also be moved reciprocally.

As shown in FIGS. 2 and 3, the gun head 1a has a mediate portion provided with a gun bore 191 which has a front end formed with an oil supply hole 192 that may be connected to an oil pipe, so that the oil liquid may be supplied to a destination. An anti-reverse valve 15 is mounted in the gun bore 191, and a bore body 17 is also mounted in the gun bore 191. The bore body 17 has a center formed with a bore 170, and has an outer wall provided with a leakproof member 171. A cap 18 is screwed on the outer wall of the bore body 17 to press the leakproof member 171. The plunger 13 in turn passes through the cap 18, the leakproof member 171 and extends into the bore 170.

The anti-reverse valve 15 includes a valve body 151 having an outer wall formed with an annular groove 152 communicated with an oil feeding hole 101. A filter net 16 is mounted on the valve body 151 and located between the annular groove 152 and the oil feeding hole 101. The valve body 151 is formed with an oil inlet hole 153a connected between the annular groove 152 and the bore 170 of the bore body 17. The valve body 151 is formed with an oil outlet hole 153b connected between the bore 170 of the bore body 17 and the oil supply hole 192. The oil inlet hole 153a of the valve body 151 is formed with an enlarged receiving space 154a located adjacent to the bore 170 of the bore body 17 for receiving a ball 155. The oil outlet hole 153b of the valve body 151 is formed with an enlarged receiving space 154b located adjacent to the bore 170 of the bore body 17 for receiving a ball 155. The enlarged receiving space 154a of the oil inlet hole 153a of the valve body 151 is formed with a reduced catch portion 156a to prevent from falling of the ball 155. The enlarged receiving space 154b of the oil outlet hole 153b of the valve body 151 is formed with a reduced catch portion 156b to prevent from falling of the ball 155.

Referring to FIG. 3, the gun body 1 is provided with an oil return hole 102 connected between the oil storage tank 3 and the oil supply hole 192 of the oil feeding pneumatic gun. A needle valve 5 is screwed on the gun body 1a, and has a distal end that may close or open the oil return hole 102.

Figure 4:
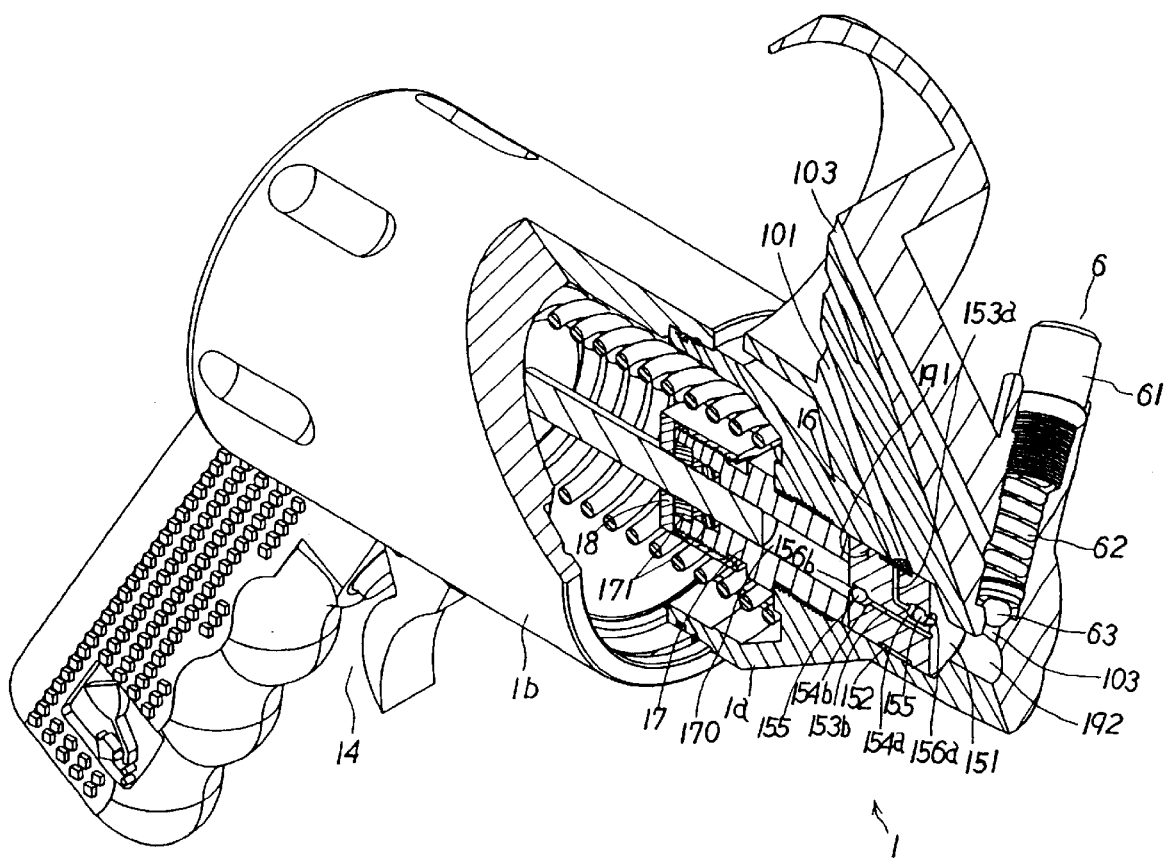
FIG. 4 is a partially cut-away cross-sectional view of anti-reverse structure of a continuous pneumatic oil feeding gun as shown in FIG. 1.

Referring to FIG. 4, the gun body 1 is provided with an oil pressure release hole 103 connected between the oil storage tank 3 and the oil supply hole 192 of the pneumatic oil feeding gun. A pressure valve 6 is screwed on the gun body 1a to close or open the oil pressure release hole 103. The pressure valve 6 includes a ball 63 that may close or open the oil pressure release hole 103, a spring 62 pressing the ball 63, and a screw 61 rested on the spring 62.

Thus, when the plunger 13 is moved backward, the oil contained in the oil storage tank 3 may be sucked into the oil feeding hole 101, then flows through the annular groove 152 and the oil inlet hole 153a of the valve body 151 of the anti-reverse valve 15, then pushes away the ball 155 in the enlarged receiving space 154a, and is then sucked into the bore 170 of the bore body 17. At the same time, the ball 155 in the enlarged receiving space 154b will block the oil outlet hole 153b due to the sucking action of the plunger 13, thereby preventing the oil contained in the oil supply hole 192 from being sucked into the bore 170 of the bore body 17.

Alternatively, when the plunger 13 is moved forward, the oil contained in the bore 170 of the bore body 17 may be pushed into the oil outlet hole 153b, then pushes away the ball 155 in the enlarged receiving space 154b, thereby opening the oil outlet hole 153b, so that the oil may be pushed into the oil supply hole 192. At the same time, the ball 155 in the enlarged receiving space 154a will block the oil inlet hole 153a due to the pushing action of the plunger 13, thereby preventing the oil contained in the bore 170 of the bore body 17 from being returned into the oil storage tank 3.

Thus, by provision of the anti-reverse valve 15, the pneumatic oil feeding gun may supply the oil outward continuously, and may provide highly pressurized oil, thereby satisfying the requirement of the user.

Referring to FIGS. 2 and 4, when the oil pressure of the pneumatic oil feeding gun is excessive, the ball 63 of the pressure valve 6 is pushed upward, so that the oil may pass through the oil pressure release hole 103 to return into the oil storage tank 3.

Referring to FIGS. 2 and 3, the needle valve 5 may be moved backward, so that the oil may pass through the oil return hole 102 to return into the oil storage tank 3.

Accordingly, the pneumatic oil feeding gun of the present invention may provide highly pressurized oil, may regulate the oil pressure, and may release the oil pressure entirely.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An anti-reverse structure of a continuous pneumatic oil feeding gun, comprising a main body provided with an oil storage tank, the main body provided with a gun bore which has a front end formed with an oil supply hole, an oil feeding hole connected between the gun bore and the oil storage tank, a plunger mounted in a bore of the bore body to move in the bore of the bore body reciprocally, wherein:

an anti-reverse valve is mounted in the gun bore, the anti-reverse valve includes a valve body having an outer wall formed with an annular groove communicated with the oil supply hole, the valve body is formed with an oil inlet hole connected between the annular groove and the bore of the bore body, the valve body is formed with an oil outlet hole connected between the bore of the bore body and the oil supply hole, the oil inlet hole of the valve body is formed with an enlarged receiving space located adjacent to the bore of the bore body for receiving a ball, the oil outlet hole of the valve body is formed with an enlarged receiving space located adjacent to the bore of the bore body for receiving a ball, the enlarged receiving space of the oil inlet hole of the valve body is formed with a reduced catch portion to prevent from falling of the ball, and the enlarged receiving space of the oil outlet hole of the valve body is formed with a reduced catch portion to prevent from falling of the ball.

2. The anti-reverse structure of a continuous pneumatic oil feeding gun in accordance with claim 1, wherein the gun body is provided with an oil return hole connected between the oil storage tank and the oil supply hole of the oil feeding pneumatic gun, and a needle valve is screwed on the gun body, and has a distal end that may close or open the oil return hole.

3. The anti-reverse structure of a continuous pneumatic oil feeding gun in accordance with claim 1, wherein the gun body is provided with an oil pressure release hole connected between the oil storage tank and the oil supply hole of the oil feeding pneumatic gun, and a pressure valve is screwed on the gun body to close or open the oil pressure release hole.

4. The anti-reverse structure of a continuous pneumatic oil feeding gun in accordance with claim 3, wherein the pressure valve includes a ball that may close or open the oil pressure release hole, a spring pressing the ball, and a screw rested on the spring.

5. The anti-reverse structure of a continuous pneumatic oil feeding gun in accordance with claim 1, wherein the bore body has a center formed with a bore, and has an outer wall provided with a leakproof member, a cap is screwed on the outer wall of the bore body to press the leakproof member, so that the plunger in turn passes through the cap, the leakproof member and extends into the bore.

6. The anti-reverse structure of a continuous pneumatic oil feeding gun in accordance with claim 1, further comprising a filter net mounted on the valve body and located between the annular groove and the oil feeding hole.

7. The anti-reverse structure of a continuous pneumatic oil feeding gun in accordance with claim 1, wherein the main body includes a gun head and a gun body, the gun head and the gun body are formed with mating semi-circular cross-sectional shaped annular positioning grooves, the annular positioning groove of the gun head is formed with a positioning hole, the gun body is formed with an elongated slit mating with the annular positioning groove, a bushing line has one end extended through the elongated slit into the positioning hole of the gun head, and the gun head or the gun body may then be rotated, so that the bushing line may be inserted into the two annular positioning grooves.

* * * * *